US011924620B2

(12) United States Patent
Jiang et al.

(10) Patent No.: US 11,924,620 B2
(45) Date of Patent: Mar. 5, 2024

(54) SPEAKER AND TERMINAL DEVICE

(71) Applicant: VIVO MOBILE COMMUNICATION CO., LTD., Guangdong (CN)

(72) Inventors: Guozhu Jiang, Guangdong (CN); Lifeng Long, Guangdong (CN)

(73) Assignee: Vivo Mobile Communication Co., Ltd., Guangdong (CN)

( * ) Notice: Subject to any disclaimer, the term of this patent is extended or adjusted under 35 U.S.C. 154(b) by 110 days.

(21) Appl. No.: 17/524,996

(22) Filed: Nov. 12, 2021

(65) Prior Publication Data

US 2022/0078558 A1 Mar. 10, 2022

Related U.S. Application Data

(63) Continuation of application No. PCT/CN2020/084915, filed on Apr. 15, 2020.

(30) Foreign Application Priority Data

May 15, 2019 (CN) ........................ 201910402735.X

(51) Int. Cl.

| | |
|---|---|
| ***H04R 9/06*** | (2006.01) |
| ***H04R 1/02*** | (2006.01) |
| ***H04R 9/18*** | (2006.01) |

(52) U.S. Cl.

CPC ............... *H04R 9/06* (2013.01); *H04R 1/025* (2013.01); *H04R 9/18* (2013.01)

(58) Field of Classification Search

CPC ............. H04R 9/06; H04R 1/025; H04R 9/18

USPC .......................................................... 381/335

See application file for complete search history.

(56) References Cited

U.S. PATENT DOCUMENTS

| | | | | |
|---|---|---|---|---|
| 7,316,289 B2 | 1/2008 | Ajiki et al. | | |
| 9,307,327 B2 | 4/2016 | Tang et al. | | |
| 2010/0202650 A1* | 8/2010 | Park | H04M 1/03 | 381/387 |
| 2013/0148834 A1 | 6/2013 | Seo | | |
| 2016/0112781 A1* | 4/2016 | Lee | H04R 1/2803 | 381/332 |
| 2018/0084323 A1* | 3/2018 | Luce | H04R 9/06 | |

(Continued)

FOREIGN PATENT DOCUMENTS

| | | |
|---|---|---|
| CN | 113438342 A | 9/2012 |
| CN | 204993827 U | 1/2016 |

(Continued)

*Primary Examiner* — Sean H Nguyen

(74) *Attorney, Agent, or Firm* — Price Heneveld LLP

(57) ABSTRACT

This disclosure provides a speaker and a terminal device. The speaker includes a speaker housing and a speaker body, where the speaker body is disposed in the speaker housing, the speaker body and the speaker housing form a speaker front cavity and a speaker rear cavity, the speaker housing is provided with a sound output channel, the sound output channel communicates with the speaker front cavity, the speaker rear cavity includes a first sub-cavity, the speaker housing includes a first spacer disposed in the first sub-cavity, the first spacer splits the first sub-cavity into a resonance tube and a resonance cavity, the resonance tube communicates with the resonance cavity, a first connecting hole is provided in a side wall of the speaker front cavity, and the speaker front cavity communicates with the resonance tube through the first connecting hole.

20 Claims, 6 Drawing Sheets

(56) References Cited

U.S. PATENT DOCUMENTS

| | | | | |
|---|---|---|---|---|
| 2018/0124506 | A1 | 5/2018 | Sun et al. | |
| 2020/0045398 | A1 | 2/2020 | Wu et al. | |
| 2020/0045415 | A1 | 2/2020 | Wu et al. | |
| 2020/0092647 | A1* | 3/2020 | Palmer | H04R 3/04 |

FOREIGN PATENT DOCUMENTS

| | | | |
|---|---|---|---|
| CN | 206481455 | U | 9/2017 |
| CN | 107318073 | A | 11/2017 |
| CN | 207070330 | U | 3/2018 |
| CN | 207070332 | U | 3/2018 |
| CN | 108882125 | A | 11/2018 |
| CN | 208638565 | U | 3/2019 |
| CN | 110177324 | A | 8/2019 |
| CN | 209659597 | U | 11/2019 |
| GB | 2574457 | B | 12/2019 |
| WO | 2016150202 | A1 | 9/2016 |

* cited by examiner

SPEAKER AND TERMINAL DEVICE

CROSS-REFERENCE TO RELATED APPLICATIONS

This application is a continuation application of International Application No. PCT/CN2020/084915 filed on Apr. 15, 2020, which claims priority to Chinese Patent Application No. 201910402735.X, filed in China on May 15, 2019, which are incorporated herein by reference in their entireties.

TECHNICAL FIELD

This disclosure relates to the field of communications device technologies, and in particular, to a speaker and a terminal device.

BACKGROUND

As user requirements increase, performance of a terminal device continues being optimized. Currently, increasingly high requirements are imposed on exterior design of terminal devices. More and more speakers have a sound hole provided on a side of a terminal device, and therefore, a sound guiding path is required to communicate with the front cavity and sound hole of the speaker. This structure is prone to resonance in the front cavity of the speaker, leading to a relatively high high-frequency resonance peak for the speaker at the 3.5 kHz-6 kHz band. This band belongs to a relatively sensitive range for human ears, and the high-frequency resonance peak produces a relatively harsh sense of hearing, which in turn affects user experience.

Currently in the industry, a typical practice is to increase length of the sound output channel to form second resonance to disperse energy of the high-frequency resonance peak in the front cavity. However, a longer sound output channel occupies a larger space, consequently affecting disposition of a battery in the terminal device.

SUMMARY

This disclosure discloses a speaker and a terminal device, to resolve the inability in the related art to suppress resonance peaks when a speaker of a terminal device is working, which results in poor user experience.

To resolve the foregoing problems, the following technical solutions are used in this disclosure:

A speaker is provided, including a speaker housing and a speaker body, where the speaker body is disposed in the speaker housing, the speaker body and the speaker housing form a speaker front cavity and a speaker rear cavity, the speaker housing is provided with a sound output channel, the sound output channel communicates with the speaker front cavity, the speaker rear cavity includes a first sub-cavity, the speaker housing includes a first spacer disposed in the first sub-cavity, the first spacer separates the first sub-cavity into a resonance tube and a resonance cavity, the resonance tube communicates with the resonance cavity, a first connecting hole is provided in a side wall of the speaker front cavity, and the speaker front cavity communicates with the resonance tube through the first connecting hole.

Optionally, in the speaker, a first end of the first spacer is connected to a first inner wall of the first sub-cavity, a second end of the first spacer extends towards a second inner wall of the first sub-cavity, the first inner wall is an inner wall close to the speaker front cavity, the first inner wall is disposed opposite the second inner wall, a second connecting hole is formed between the second end of the first spacer and the second inner wall, and the resonance cavity communicates with the resonance tube through the second connecting hole.

Optionally, in the speaker, the speaker housing includes a first housing and a second housing, the first housing is provided with the sound output channel, the speaker body is disposed between the first housing and the second housing, the speaker body and the first housing form the speaker front cavity, the first housing is detachably connected to the second housing, and the first housing, the second housing, and the speaker body enclose at least a part of the speaker rear cavity.

Optionally, in the speaker, the first housing includes a bottom wall, and a first side wall and a second side wall that are disposed on the bottom wall, the second side wall is disposed in an area surrounded by the first side wall, the speaker body is fastened between the second side wall and the second housing, the speaker body, the second side wall, and the bottom wall form the speaker front cavity, the speaker body, the first side wall, the second housing, the bottom wall, and the second side wall enclose the speaker rear cavity, and the second side wall is provided with the first connecting hole.

Optionally, in the speaker, the first housing includes a second spacer; the second spacer is connected to an outer side of the second side wall; the second spacer is disposed between the second side wall and the first side wall; the first spacer is disposed in an area enclosed by the second spacer and the second side wall; and the bottom wall, the second spacer, the second side wall, and the second housing enclose the first sub-cavity.

Optionally, in the speaker, the first housing further includes a top wall, a sealing sheet, and a second spacer, the second spacer is connected to an outer side of the second side wall, the second spacer is disposed between the second side wall and the first side wall, the first spacer is disposed in an area enclosed by the second spacer and the second side wall, the top wall covers an area enclosed by the second spacer and the second side wall, an opening is provided in an area, opposite the top wall, of the bottom wall, the sealing sheet hermetically covers the opening, and the sealing sheet, the top wall, the second spacer, and the second side wall enclose the first sub-cavity.

Optionally, in the speaker, a distance between a surface of the top wall facing the opening and the bottom wall is a first distance, the second side wall is provided with a communication groove, the bottom wall and the communication groove enclose the first connecting hole, a distance between a bottom surface of the communication groove facing the bottom wall and the bottom wall is a second distance, and the first distance is smaller than the second distance.

Optionally, in the speaker, an edge of the top wall connected to an end opening of the first connecting hole is provided with a chamfered surface.

Optionally, in the speaker, the sealing sheet is coplanar with an outer surface of the bottom wall.

Optionally, in the speaker, the sealing sheet is a plastic sheet, a steel sheet or a PET sheet.

Optionally, in the speaker, an adhesive layer is provided on an inner surface of the first side wall, and the speaker body is adhesively fixed to the first housing.

Optionally, in the speaker, a first end of the resonance tube and a first end of the resonance cavity are isolated from each other, and a second end of the resonance tube and a second end of the resonance cavity communicate with each other.

A terminal device is provided and includes the speaker described above.

The following beneficial effects may be achieved by the technical solutions used in this disclosure:

The speaker disclosed in this disclosure is an improvement to a structure of a speaker in the related art. With an optimized structure of the speaker rear cavity, the speaker rear cavity includes the first sub-cavity, and the first sub-cavity is separated into the resonance tube and the resonance cavity by the first spacer. The resonance tube communicates with the speaker front cavity through the first connecting hole, so that the first sub-cavity and the speaker front cavity form a Helmholtz resonator structure with a specific resonant frequency. This structure is an anti-resonant cavity. The anti-resonant cavity forms a side branch structure of the speaker front cavity. When the resonant frequency of the anti-resonant cavity is close to the resonant frequency of the speaker front cavity, the resonance peaks generated during working of the speaker may be suppressed, thereby improving sound effects and ultimately improving user experience.

BRIEF DESCRIPTION OF DRAWINGS

The drawings described herein are used to provide a further understanding of this disclosure and constitute a part of this disclosure. The example embodiments of this disclosure and their descriptions are used to explain this disclosure, and do not constitute any inappropriate limitation on this disclosure. In the drawings.

Figure 1:
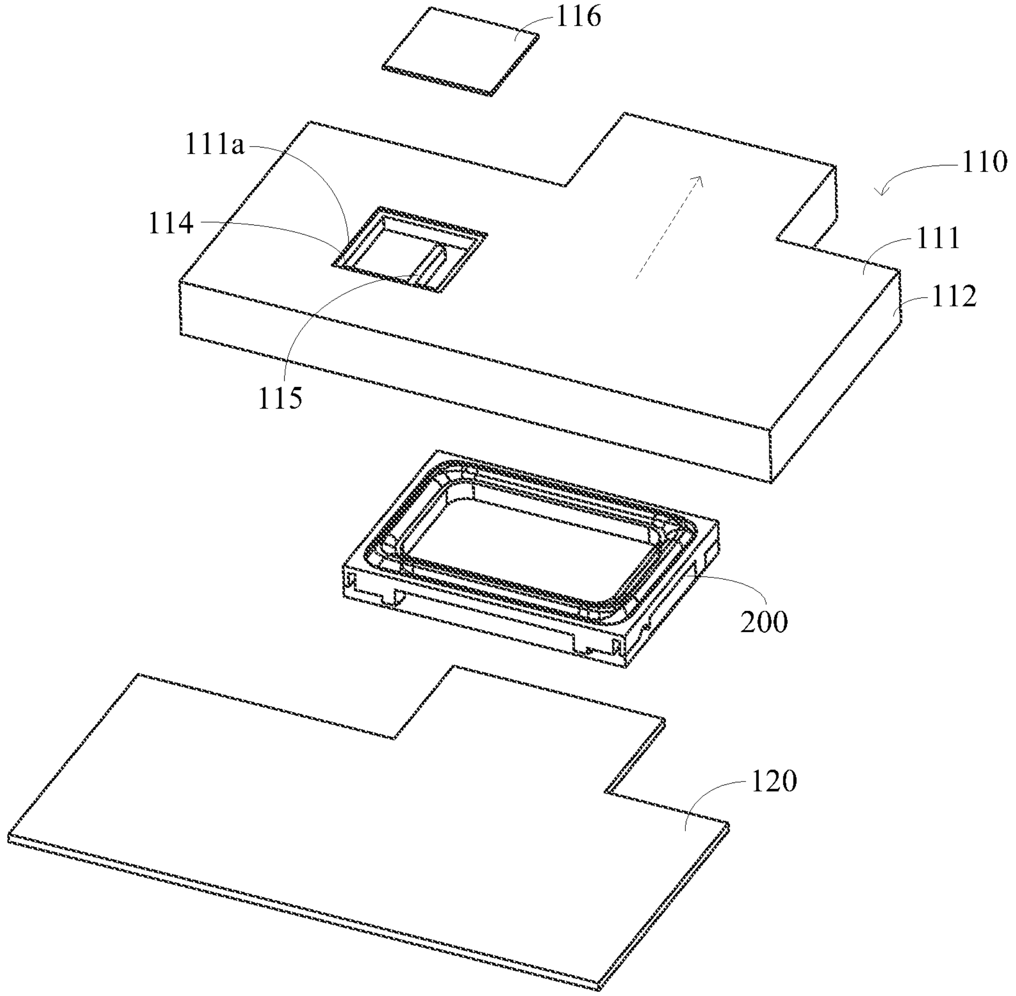
FIG. 1 is a schematic diagram of an exploded structure of a speaker disclosed in the embodiment of this disclosure, and the dotted arrow in FIG. 1 is a sound output direction.

Reference signs are described as follows:

- 100: speaker housing; 110: first housing; 111: bottom wall; 111*a*: opening; 112: first side wall; 113: second side wall; 114: second spacer; 115: first spacer; 116: sealing sheet; 117: adhesive layer; 118: top wall; 120: second housing;
- 200: speaker body;
- 300: device housing; 310: sound hole;
- 400: battery; and
- A: speaker front cavity; A1: first connecting hole; A2: chamfered surface; B: speaker rear cavity; B1: first sub cavity; B11: resonance tube; B12: resonance cavity; B13: second connecting hole; C: sound output channel.

DESCRIPTION OF EMBODIMENTS

To make the objectives, technical solutions, and advantages of this disclosure more clear, the following clearly and completely describes the technical solutions in the embodiments of this disclosure with reference to the accompanying drawings in the embodiments of this disclosure. Apparently, the described embodiments are some rather than all of the embodiments of this disclosure. All other embodiments obtained by a person of ordinary skill in the art based on the embodiments of this disclosure without creative efforts shall fall within the protection scope of this disclosure.

With the accompanying drawings, the following clarifies the technical solutions disclosed in the embodiments of this disclosure in detail.

Referring to FIG. 1 to FIG. 7, the embodiments of this disclosure disclose a speaker, and the disclosed speaker may be applied to a terminal device. The disclosed speaker includes a speaker housing 100 and a speaker body 200.

The speaker housing 100 is a basic component of the speaker, and the speaker housing 100 provides an installation foundation for the speaker body 200. In the embodiments of this disclosure, the speaker body 200 is disposed in the speaker housing 100.

The speaker body 200 and the speaker housing 100 form a speaker front cavity A and a speaker rear cavity B. The speaker housing 100 is provided with a sound output channel C, and the sound output channel C communicates with the speaker front cavity A. During operation of the speaker, a diaphragm of the speaker body 200 produces sound and vibrates, pushing movement of air in the speaker front cavity A to produce sound. The sound is then transmitted from the sound output channel C, implementing sound production of the speaker.

In this embodiment of this disclosure, the speaker rear cavity B includes a first sub-cavity B1. The speaker housing 100 further includes a first spacer 115. The first spacer 115 is disposed in the first sub-cavity B1. The first spacer 115 separates the first sub-cavity B1 into a resonance tube B11 and a resonance cavity B12. The resonance tube B11 communicates with the resonance cavity B12. A first connecting hole A1 is provided in a side wall of the speaker front cavity A, and the speaker front cavity A may communicate with the resonance tube B11 through the first connecting hole A1. Specifically, a first end of the resonance tube B11 communicates with the speaker front cavity A through the first connecting hole A1, that is, the first connecting hole A1 is provided in a position of the side wall of the speaker front cavity A, opposite the first end of the resonance tube B11. Certainly, the first connecting hole A1 may also be opened in other positions, and this embodiment of this disclosure does not limit the specific position of the first connecting hole A1.

Specifically, the first end of the resonance tube B11 and a first end of the resonance cavity B12 may be isolated from each other, and a second end of the resonance tube B11 and a second end of the resonance cavity B12 communicate with each other, implementing communication between the resonance tube B11 and the resonance cavity B12. Certainly, the resonance tube B11 and the resonance cavity B12 may alternatively communicate at other positions, without being limited to the second ends of the two.

The speaker disclosed in this embodiment of this disclosure is an improvement to a structure of a speaker in the related art. With an optimized structure of the speaker rear cavity B, the speaker rear cavity B includes the first sub-cavity B1, and the first sub-cavity B1 is separated into the resonance tube B11 and the resonance cavity B12 by the first spacer 115. The resonance tube B11 communicates with the speaker front cavity A through the first connecting hole A1, so that the first sub-cavity B1 and the speaker front cavity A form a Helmholtz resonator structure with a specific resonant frequency. This structure is an anti-resonant cavity. The anti-resonant cavity forms a side branch structure of the speaker front cavity A. When the resonant frequency of the anti-resonant cavity is close to the resonant frequency of the speaker front cavity A, the resonance peaks generated during working of the speaker may be suppressed, thereby improving sound effects and ultimately improving user experience.

In the actual design process, those skilled in the art may adjust parameters, such as equivalent opening size and length of the resonance tube B11, and parameters, such as volume for the resonance cavity B12, to make the resonant frequency of the anti-resonant cavity equal to the resonant frequency of the speaker front cavity A, better suppressing the resonance peak.

In this embodiment of this disclosure, the first spacer 115 may have a variety of shapes, and the first spacer 115 separates the first sub-cavity B1 in a variety of manners. The specific shape of the first spacer 115 and a manner of separating the first sub-cavity B1 are not limited in this embodiment of this disclosure. In a specific implementation, a first end of the first spacer 115 may be connected to an inner wall of the first sub-cavity B1, and a second end of the first spacer 115 may extend to a second inner wall of the first sub-cavity B1. The first inner wall is disposed opposite the second inner wall. The first inner wall is closer to an inner wall of the speaker front cavity A, that is, a distance between the first inner wall and the speaker front cavity A is smaller than a distance between the second inner wall and the speaker front cavity A. A second connecting hole B13 is formed between the second end of the first spacer 115 and the second inner wall, and the resonance cavity B12 communicates with the resonance tube B11 through the second connecting hole B13. In this case, the first spacer 115 is a regular strip, so that the resonance tube B11 and the resonance cavity B12 that are separated by the first spacer 115 are relatively regular. This is more conducive to adjusting the resonant frequency of the anti-resonant cavity.

Figure 6:
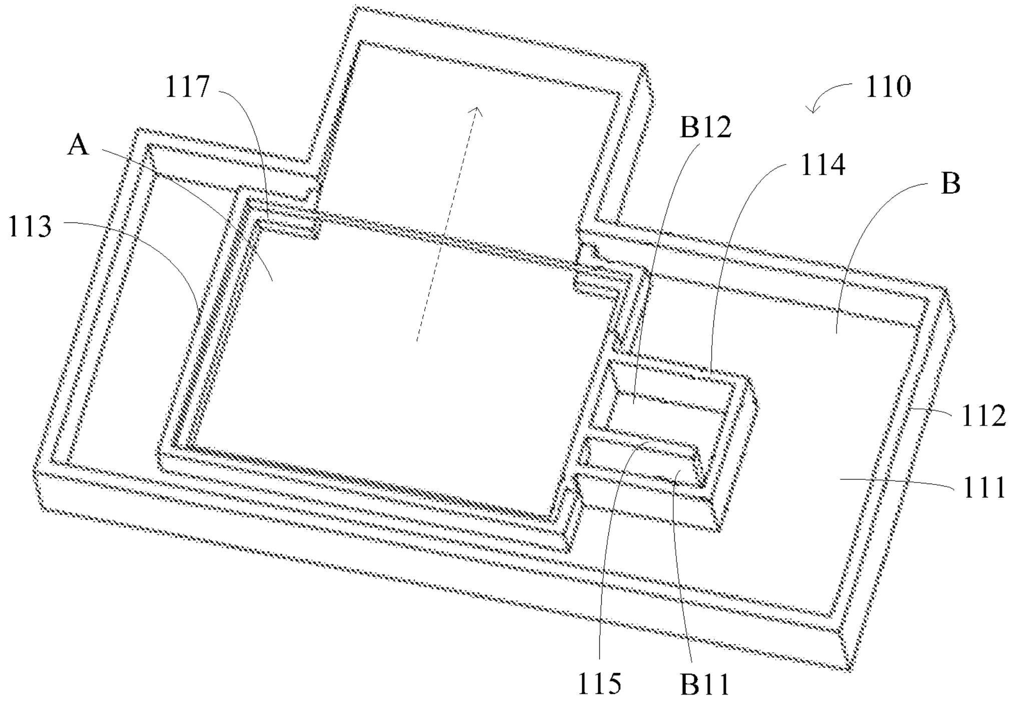
FIG. 6 is an enlarged schematic diagram of a part of the structure in FIG. 5, and the dotted arrow in FIG. 6 is a sound output direction.
Figure 7:
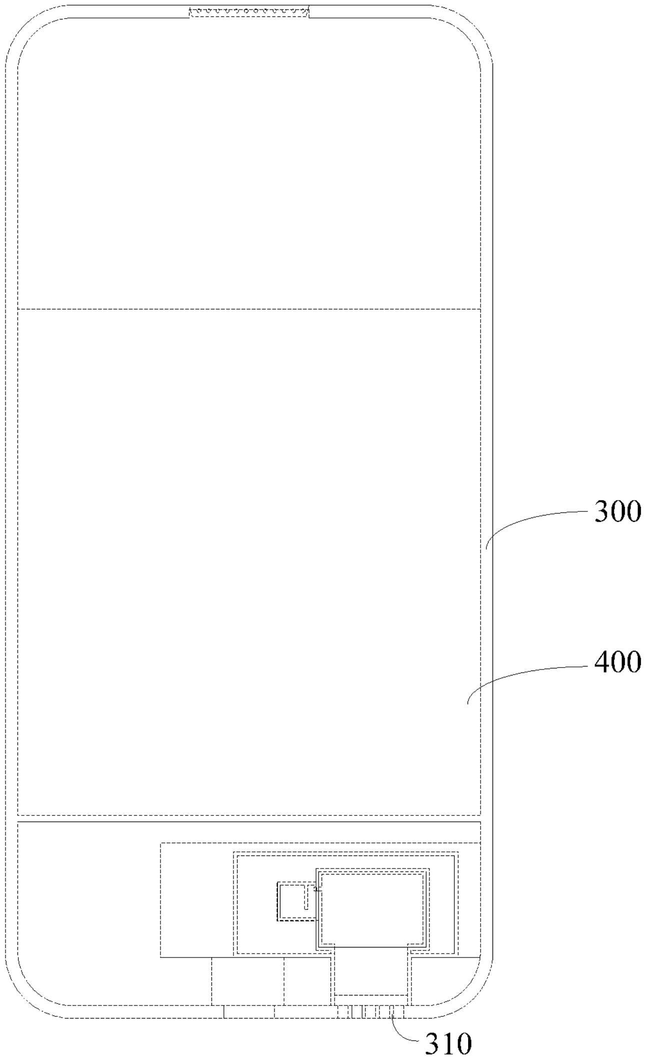
FIG. 7 is a schematic structural diagram of a part of a terminal device disclosed in the embodiment of this disclosure.

Likewise, the first spacer 115 may extend in various directions. For example, as shown in FIG. 1, an extension direction of the first spacer 115 is substantially the same as a sound output direction. Specifically, the extension direction of the first spacer 115 may be parallel to the sound output direction. For another example, as shown in FIG. 6, the extension direction of the first spacer 115 is substantially perpendicular to the sound output direction. Specifically, the extension direction of the first spacer 115 may be perpendicular to the sound output direction. The first spacer 115 separates the first sub-cavity B1. This embodiment of this disclosure does not limit the specific extension direction of the first spacer 115.

Figure 4:
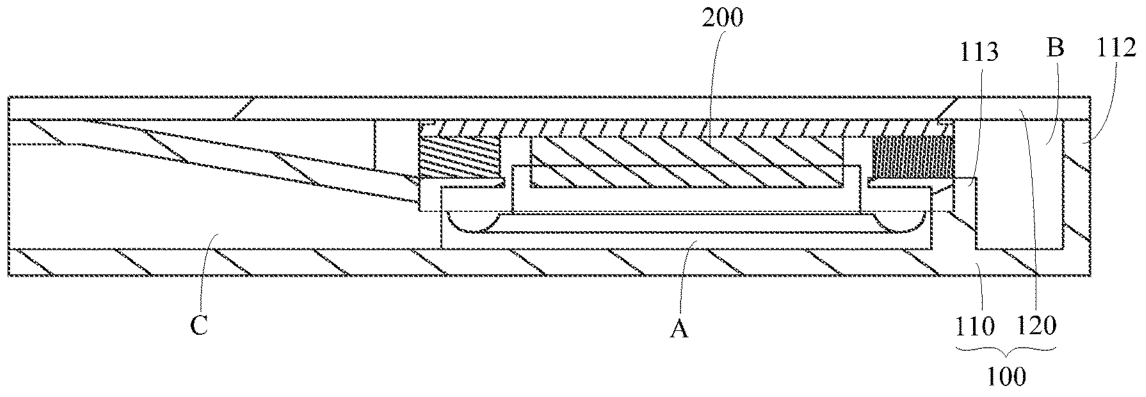
FIG. 4 is a cross-sectional diagram of a speaker disclosed in the embodiment of this disclosure.

In the speaker disclosed in this embodiment of this disclosure, the speaker housing 100 may include a first housing 110 and a second housing 120. The first housing 110 and the second housing 120 may be detachably connected, and the speaker body 200 may be disposed between the first housing 110 and the second housing 120. A sound output channel C may be provided in the first housing 110 or the second housing 120. Certainly, the sound output channel C may be formed by connecting the first housing 110 and the second housing 120. As shown in FIG. 4, the first housing 110 is provided with the sound output channel C. The speaker body 200 and the first housing 110 form the speaker front cavity A. The first housing 110, the second housing 120, and the speaker body 200 enclose at least part of the speaker rear cavity B. The speaker housing 100 with the foregoing structure is undoubtedly more convenient for assembly of each part of the speaker and forming of each cavity.

The first housing 110 may have a variety of structures. The first housing 110 may include a bottom wall 111, and a first side wall 112 and a second side wall 113 that are disposed on the bottom wall 111. The second side 113 wall is disposed in an area surrounded by the first side wall 112. The speaker body 200 is fixed between the second side wall 113 and the second housing 120. In this case, the speaker body 200 is supported on the bottom wall 111 through the second side wall 113, and the speaker body 200, the second side wall 113, and the bottom wall 111 form the speaker front cavity A. The speaker body 200, the first side wall 112, the second housing 120, the bottom wall 111, and the second side wall 113 enclose the speaker rear cavity B. The second side wall 113 is provided with the first connecting hole A1. With the structure of the first housing 110, it is undoubtedly easier to form the speaker front cavity A and the speaker rear cavity B, and also facilitates mass production of the first housing 110. Then, the first housing 110 is assembled with the second housing 120 and the speaker body 200. This manufacturing method is conducive to mass production of speakers.

Figure 5:
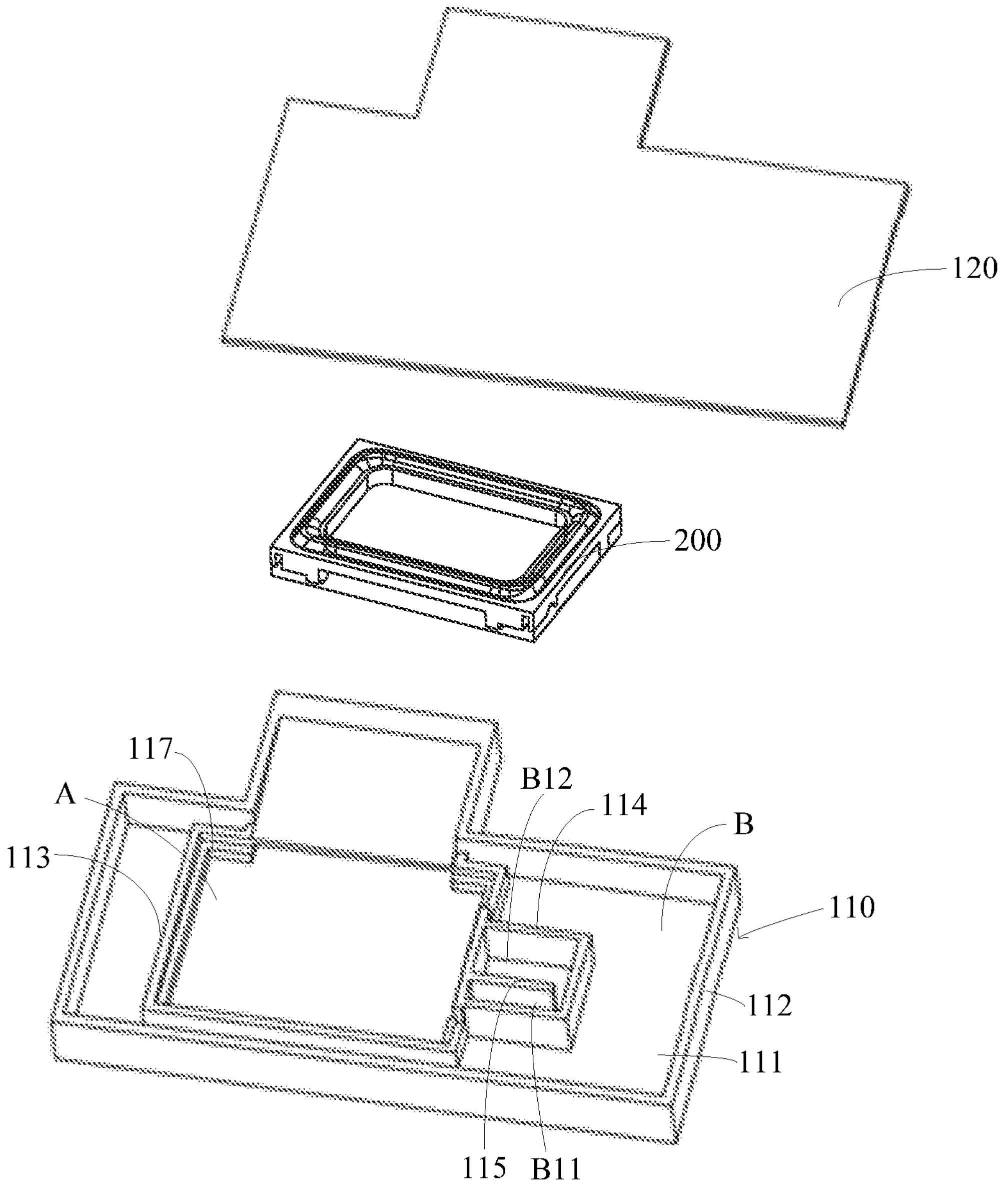
FIG. 5 is a schematic diagram of an exploded structure of another speaker disclosed in the embodiment of this disclosure.

In some optional embodiments, the first housing 110 may include a second spacer 114. The second spacer 114 is connected to an outer side of the second side wall 113. The second spacer 114 is disposed between the second side wall 113 and the first side wall 112. The first spacer 115 is disposed in an area enclosed by the second spacer 114 and the second side wall 113. The bottom wall 111, the second spacer 114, the second side wall 113, and the second housing 120 enclose the first sub-cavity B1. In other words, the first sub-cavity B1 is formed by connecting the first housing 110 to the second housing 120. As shown in FIG. 5, heights of the first spacer 115, the second spacer 114, and part of the second side wall 113 need to match a gap obtained by connecting the first housing 110 to the second housing 120, so as to form the first sub-cavity B1.

In the first housing 110 with the foregoing structure, the bottom wall 111, the first side wall 112, the second side wall 113, the first spacer 115, and the second spacer 114 are easier to form. After the first housing 110 is formed, the second housing 120 is connected to the first housing 110 to make corresponding parts enclose the first sub-cavity B1.

Certainly, the first sub-cavity B1 may also be formed in other ways. In another specific implementation, referring to FIG. 1 to FIG. 3, the first housing 110 may also include a top wall 118 and the second spacer 114. The second spacer 114 is connected to an outer side of the second side wall 113. The second spacer 114 is disposed between the second side wall 113 and the first side wall 112. The first spacer 115 is disposed in an area formed by the second spacer 114 and the second side wall 113. The top wall 118 covers on an area enclosed by the second spacer 114 and the second side wall 113. In this case, the second spacer 114 and the second side wall 113 enclose a space and a side of the space facing the second housing 120, is already covered by the top wall 118. To facilitate forming of the first sub-cavity B1, an opening 111*a* may be provided in an area, opposite the top wall 118, of the bottom wall 111. In this case, the first housing 110 further includes a sealing sheet 116. The sealing sheet 116 hermetically covers the opening 111*a*. The sealing sheet 116, the top wall 118, the second spacer 114, and the second side wall 113 enclose the first sub-cavity B1. Specifically, the sealing sheet 116 may be assembled with the opening 111*a* by bonding.

Generally, the bottom wall 111, the first side wall 112, the second side wall 113, the first spacer 115, and the second spacer 114 may be formed integrally, usually by injection molding. The provision of the opening 111 makes demoulding easier in the molding process.

Certainly, the first sub-cavity B1 may be formed in various ways and is not limited to the foregoing structures. In the two forming methods described above, the first sub-cavity B1 is formed by connecting components, facilitating manufacturing of the speaker housing 100.

Figure 2:
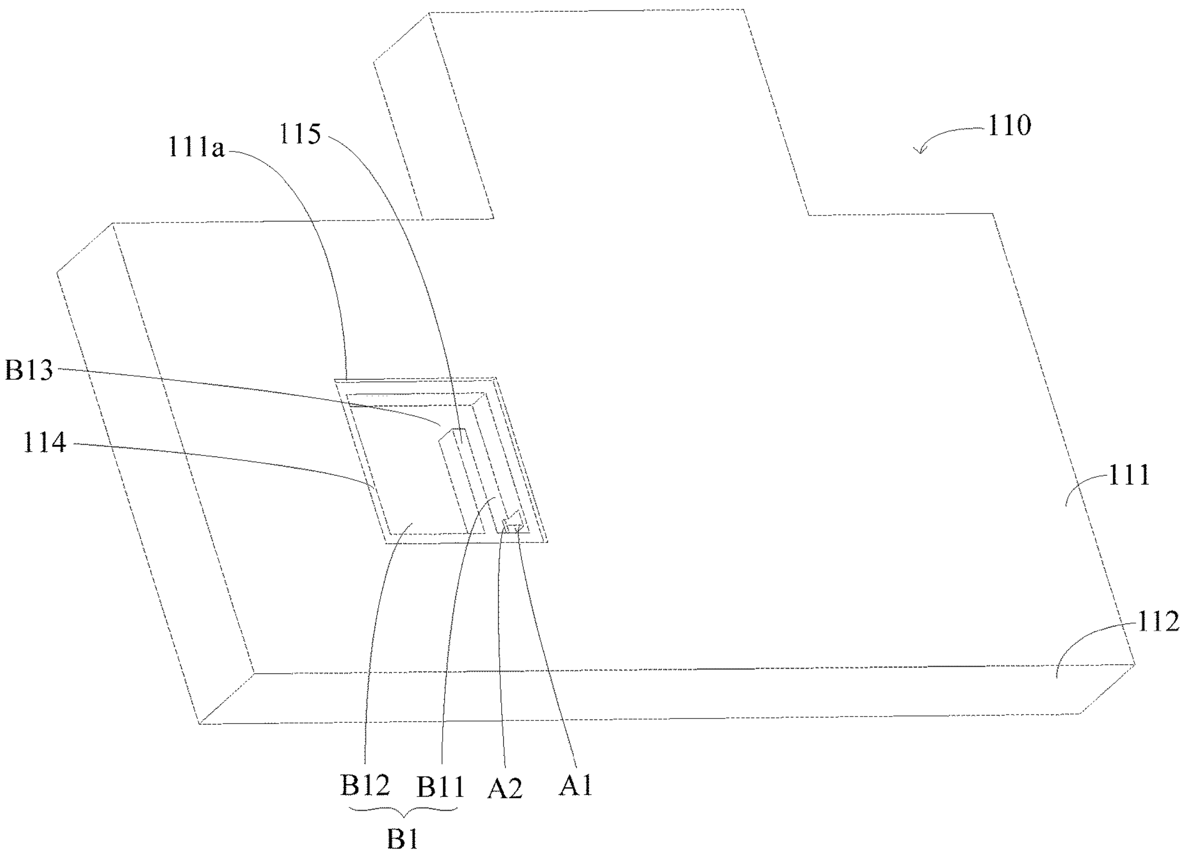
FIG. 2 is an enlarged schematic diagram of a part of the structure in FIG. 1.
Figure 3:
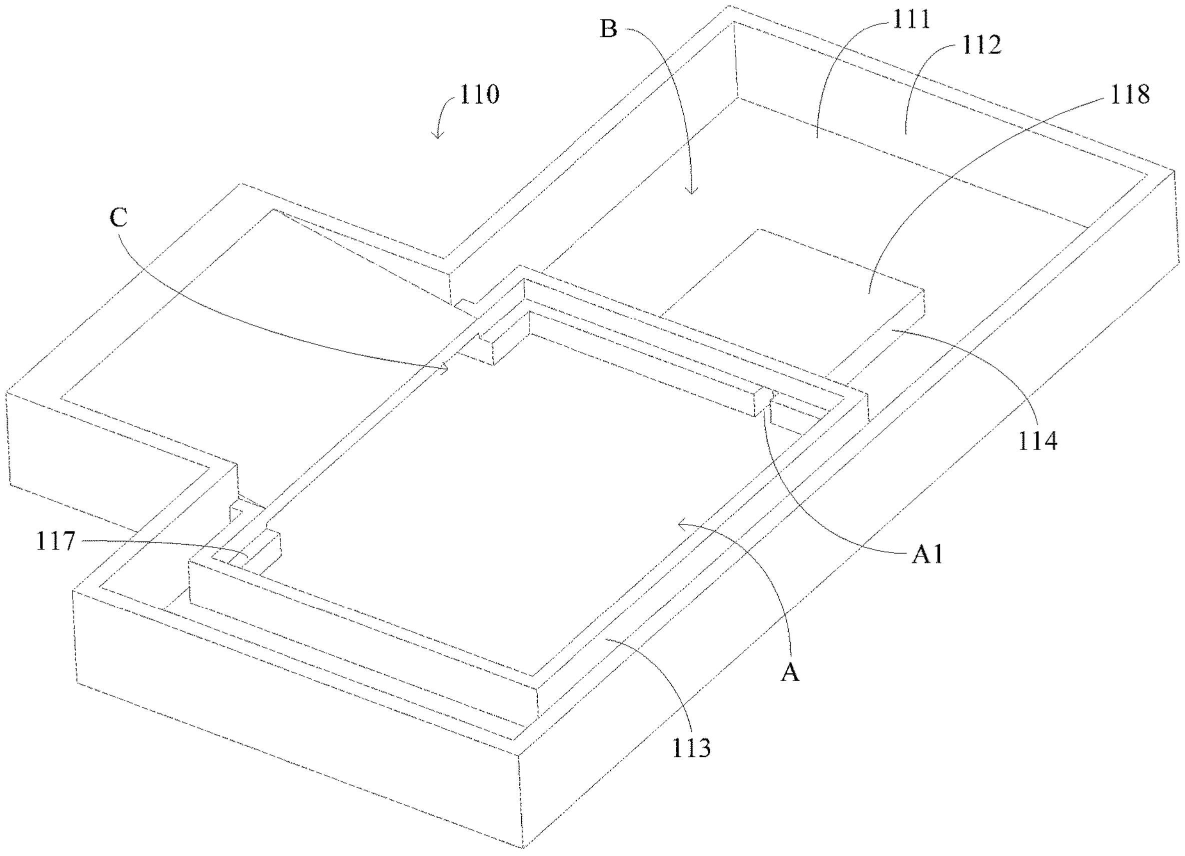
FIG. 3 is a schematic structural diagram of FIG. 2 from another perspective.

In the speaker disclosed in this embodiment of this disclosure, the first sub-cavity B1 is a part of the speaker rear cavity B, that is, the first sub-cavity B1 reduces the volume of the speaker rear cavity B. In order to reduce the influence on the speaker rear cavity B and low-frequency performance: In some optional embodiments, a distance between a surface of the top wall 118 facing the opening 111*a* and the bottom wall 111 is a first distance. The second side wall 113 is provided with a communication groove, and the bottom wall 111 and the communication groove enclose the first connecting hole A1. A distance between the bottom surface of the communication groove facing the bottom wall 111 and the bottom wall 111 is a second distance, and the first distance is smaller than the second distance, as shown in FIG. 2 and FIG. 3. In this case, this helps reduce the height of the first sub-cavity B1, to reduce space occupied by each part of the first sub-cavity B1 in the speaker rear cavity B, thereby imposing a relatively small impact on low-frequency performance of the speaker.

In this case, a part of an end opening of the first connecting hole A1 facing the speaker rear cavity B is covered by the top wall 118. In order to reduce the influence of this part of the structure on the air flow, in some optional embodiments, the edge of the top wall 118 connected to the end opening of the first connecting hole A1 may be provided with a chamfered surface A2, allowing smoother air flow in the resonance tube B11 and the resonance cavity B12.

In order to improve the exterior performance of the speaker, in some optional embodiments, the sealing sheet 116 may be coplanar with an outer surface of the bottom wall 111. In this embodiment of this disclosure, the sealing sheet 116 may be a plastic sheet, a steel sheet, or a PET sheet. Certainly, this embodiment of this disclosure does not limit the specific material of the sealing sheet 116.

As described above, the speaker body 200 is disposed between the first housing 110 and the second housing 120. Specifically, the speaker body 200 may be sandwiched between the first housing 110 and the second housing 120; or may be fixedly assembled with one of the first housing 110 and the second housing 120 in advance before the first housing 110 is connected to the second housing 120. Referring to FIG. 3, an adhesive layer 117 is provided on an inner surface of the first side wall 112, and the speaker body 200 may be adhesively fixed to the first housing 110. In this case, the operator may first bond the speaker body 200 to the first housing 110, so that the speaker body 200 and the first housing 110 may form the speaker front cavity A. On the premise of ensuring that the speaker front cavity A meets the design requirements, the second housing 120 is installed. This manner helps reduce a rework rate in the assembly process.

As shown in FIG. 1 to FIG. 6, the speaker rear cavity B is disposed outside the speaker front cavity A, and the first sub-cavity B1 is disposed on one side of the speaker front cavity A. Such layout is only one specific layout manner. The speaker rear cavity B and the speaker front cavity A may alternatively be arranged in other manners. For example, the speaker rear cavity B may overlap the speaker front cavity A. In this case, the first sub-cavity B1 may be located above or below the speaker front cavity A. Certainly, the embodiment of this disclosure does not limit the specific layout method of the speaker rear cavity B and the speaker front cavity A, nor does it limit the specific positional relationship between the speaker front cavity A and the first sub-cavity B1.

Based on the speaker disclosed in this embodiment of this disclosure, an embodiment of this disclosure discloses a terminal device, and the disclosed terminal device includes the speaker described in the foregoing embodiment. Specifically, by referring to FIG. 7, the speaker may be disposed in a device housing 300 of the terminal device. A battery 400 is disposed in the device housing 300. The speaker is disposed on one side of the battery 400, and the device housing 300 is provided with a sound hole 310. The sound hole 310 communicates with the sound channel C of the speaker, so the speaker makes sound.

The terminal device disclosed in this embodiment of this disclosure may be a mobile phone, a tablet computer, an e-book reader, a game console, a wearable device, and so on. The embodiments of this disclosure do not limit the specific types of terminal devices.

The foregoing embodiments of this disclosure focus on differences between embodiments. Provided that optimization characteristics between the embodiments do not contradict with each other, the optimization characteristics can be combined to form a better embodiment. For conciseness of this specification, details are not repeated herein.

The foregoing descriptions are only embodiments of this disclosure and do not constitute any limitation on this disclosure. For those skilled in the art, this disclosure may have different changes and variations. Any modifications, equivalent replacement, improvements, and so on made within the spirit and principles of this disclosure shall fall in the scope of the claims of this disclosure.

What is claimed is:

1. A speaker, comprising a speaker housing and a speaker body, wherein the speaker body is disposed in the speaker housing, the speaker body and the speaker housing form a speaker front cavity and a speaker rear cavity, the speaker housing is provided with a sound output channel, the sound output channel communicates with the speaker front cavity, the speaker rear cavity comprises a first sub-cavity, the speaker housing comprises a first spacer disposed in the first sub-cavity, the first spacer splits the first sub-cavity into a resonance tube and a resonance cavity, the resonance tube communicates with the resonance cavity, a first connecting hole is provided in a side wall of the speaker front cavity, and the speaker front cavity communicates with the resonance tube through the first connecting hole;

wherein the speaker housing comprises a first housing and a second housing, the first housing is provided with the sound output channel, the speaker body is disposed between the first housing and the second housing, the speaker body and the first housing form the speaker front cavity, the first housing is detachably connected to the second housing, and the first housing, the second housing, and the speaker body enclose at least a part of the speaker rear cavity;

wherein the first housing comprises a bottom wall, and a first side wall and a second side wall that are disposed on the bottom wall, the second side wall is disposed in an area surrounded by the first side wall, the speaker body is fastened between the second side wall and the second housing, the speaker body is supported on the bottom wall through the second side wall, the speaker body, the second side wall, and the bottom wall form the speaker front cavity, the speaker body, the first side wall, the second housing, the bottom wall, and the second side wall enclose the speaker rear cavity, and the second side wall is provided with the first connecting hole.

2. The speaker according to claim 1, wherein a first end of the first spacer is connected to a first inner wall of the first sub-cavity, a second end of the first spacer extends towards a second inner wall of the first sub-cavity, the first inner wall is an inner wall close to the speaker front cavity, the first inner wall is disposed opposite the second inner wall, a second connecting hole is formed between the second end of the first spacer and the second inner wall, and the resonance cavity communicates with the resonance tube through the second connecting hole.

3. The speaker according to claim 1, wherein the first housing comprises a second spacer; the second spacer is connected to an outer side of the second side wall; the second spacer is disposed between the second side wall and the first side wall; the first spacer is disposed in an area enclosed by the second spacer and the second side wall; and the bottom wall, the second spacer, the second side wall, and the second housing enclose the first sub-cavity.

4. The speaker according to claim 1, wherein the first housing further comprises a top wall, a sealing sheet, and a second spacer, the second spacer is connected to an outer side of the second side wall, the second spacer is disposed between the second side wall and the first side wall, the first spacer is disposed in an area enclosed by the second spacer and the second side wall, the top wall covers an area enclosed by the second spacer and the second side wall, an opening is provided in an area, opposite the top wall, of the bottom wall, the sealing sheet hermetically covers the opening, and the sealing sheet, the top wall, the second spacer, and the second side wall enclose the first sub-cavity.

5. The speaker according to claim 4, wherein a distance between a surface of the top wall facing the opening and the bottom wall is a first distance, the second side wall is provided with a communication groove, the bottom wall and the communication groove enclose the first connecting hole, a distance between a bottom surface of the communication groove facing the bottom wall and the bottom wall is a second distance, and the first distance is smaller than the second distance.

6. The speaker according to claim 5, wherein an edge of the top wall connected to an end opening of the first connecting hole is provided with a chamfered surface.

7. The speaker according to claim 4, wherein the sealing sheet is coplanar with an outer surface of the bottom wall.

8. The speaker according to claim 4, wherein the sealing sheet is a plastic sheet, a steel sheet or a polyethylene terephthalate (PET) sheet.

9. The speaker according to claim 1, wherein an adhesive layer is provided on an inner surface of the first side wall, and the speaker body is adhesively fixed to the first housing.

10. The speaker according to claim 1, wherein a first end of the resonance tube and a first end of the resonance cavity are isolated from each other, and a second end of the resonance tube and a second end of the resonance cavity communicate with each other.

11. A terminal device, comprising a speaker, wherein the speaker comprises a speaker housing and a speaker body, wherein the speaker body is disposed in the speaker housing, the speaker body and the speaker housing form a speaker front cavity and a speaker rear cavity, the speaker housing is provided with a sound output channel, the sound output channel communicates with the speaker front cavity, the speaker rear cavity comprises a first sub-cavity, the speaker housing comprises a first spacer disposed in the first sub-cavity, the first spacer splits the first sub-cavity into a resonance tube and a resonance cavity, the resonance tube communicates with the resonance cavity, a first connecting hole is provided in a side wall of the speaker front cavity, and the speaker front cavity communicates with the resonance tube through the first connecting hole;

wherein the speaker housing comprises a first housing and a second housing, the first housing is provided with the sound output channel, the speaker body is disposed between the first housing and the second housing, the speaker body and the first housing form the speaker front cavity, the first housing is detachably connected to the second housing, and the first housing, the second housing, and the speaker body enclose at least a part of the speaker rear cavity;

wherein the first housing comprises a bottom wall, and a first side wall and a second side wall that are disposed on the bottom wall, the second side wall is disposed in an area surrounded by the first side wall, the speaker body is fastened between the second side wall and the second housing, the speaker body is supported on the bottom wall through the second side wall, the speaker body, the second side wall, and the bottom wall form the speaker front cavity, the speaker body, the first side wall, the second housing, the bottom wall, and the second side wall enclose the speaker rear cavity, and the second side wall is provided with the first connecting hole.

12. The terminal device according to claim 11, wherein a first end of the first spacer is connected to a first inner wall of the first sub-cavity, a second end of the first spacer extends towards a second inner wall of the first sub-cavity, the first inner wall is an inner wall close to the speaker front cavity, the first inner wall is disposed opposite the second inner wall, a second connecting hole is formed between the second end of the first spacer and the second inner wall, and the resonance cavity communicates with the resonance tube through the second connecting hole.

13. The terminal device according to claim 11, wherein the first housing comprises a second spacer; the second spacer is connected to an outer side of the second side wall; the second spacer is disposed between the second side wall and the first side wall; the first spacer is disposed in an area enclosed by the second spacer and the second side wall; and the bottom wall, the second spacer, the second side wall, and the second housing enclose the first sub-cavity.

14. The terminal device according to claim 11, wherein the first housing further comprises a top wall, a sealing sheet, and a second spacer, the second spacer is connected to an outer side of the second side wall, the second spacer is disposed between the second side wall and the first side wall, the first spacer is disposed in an area enclosed by the second spacer and the second side wall, the top wall covers an area enclosed by the second spacer and the second side wall, an opening is provided in an area, opposite the top wall, of the bottom wall, the sealing sheet hermetically covers the opening, and the sealing sheet, the top wall, the second spacer, and the second side wall enclose the first sub-cavity.

15. The terminal device according to claim 14, wherein a distance between a surface of the top wall facing the opening and the bottom wall is a first distance, the second side wall is provided with a communication groove, the bottom wall and the communication groove enclose the first connecting hole, a distance between a bottom surface of the communication groove facing the bottom wall and the bottom wall is a second distance, and the first distance is smaller than the second distance.

16. The terminal device according to claim 15, wherein an edge of the top wall connected to an end opening of the first connecting hole is provided with a chamfered surface.

17. The terminal device according to claim 14, wherein the sealing sheet is coplanar with an outer surface of the bottom wall.

18. The terminal device according to claim 14, wherein the sealing sheet is a plastic sheet, a steel sheet or a polyethylene terephthalate (PET) sheet.

19. The terminal device according to claim 11, wherein an adhesive layer is provided on an inner surface of the first side wall, and the speaker body is adhesively fixed to the first housing.

20. The terminal device according to claim 11, wherein a first end of the resonance tube and a first end of the resonance cavity are isolated from each other, and a second end of the resonance tube and a second end of the resonance cavity communicate with each other.

* * * * *